US008269169B1

(12) United States Patent
Sinton et al.

(10) Patent No.: US 8,269,169 B1
(45) Date of Patent: Sep. 18, 2012

(54) NANOTUBE BASED POLARIMETRIC ELECTROMAGNETIC SENSOR AND FOCAL PLANE ARRAY

(75) Inventors: Steven W. Sinton, Palo Alto, CA (US); Carey L. Cates, Mountain View, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 98 days.

(21) Appl. No.: 12/764,524

(22) Filed: Apr. 21, 2010

(51) Int. Cl.
*G01J 5/00* (2006.01)
(52) U.S. Cl. .................. 250/338.1; 250/330; 356/364; 356/367
(58) Field of Classification Search ............. 250/338.1, 250/330; 356/364, 367
See application file for complete search history.

(56) References Cited

U.S. PATENT DOCUMENTS

| | | | | |
|---|---|---|---|---|
| 5,416,324 | A * | 5/1995 | Chun | 250/341.3 |
| 6,122,404 | A | 9/2000 | Barter et al. | |
| 6,624,416 | B1 * | 9/2003 | Bardo et al. | 250/338.1 |
| 6,756,120 | B2 | 6/2004 | Smith et al. | |
| 7,054,064 | B2 | 5/2006 | Jiang et al. | |
| 7,723,684 | B1 * | 5/2010 | Haddon et al. | 250/338.1 |
| 8,009,284 | B2 * | 8/2011 | Xiao et al. | 356/218 |
| 2010/0296088 | A1 * | 11/2010 | Xiao et al. | 356/319 |

FOREIGN PATENT DOCUMENTS

EP 1 705 469 9/2006

OTHER PUBLICATIONS

Itkis et al., Bolometric Infrared Photorsponse of Suspended Single Walled Carbon Nanotube Films, Apr. 21, 2006, Science Magazine, vol. 312, 413-416.*
M. Engle et al., "Thin Film Nanotube Transistors Based on Self-Assembled, Aligned, Semiconducting Carbon Nanotube Arrays," ACS Nano, 2008 2(12), pp. 2445-2452.
M. E. Itkis et al., "Spectroscopic Study of the Fermi Level Electronic Structure of Single-Walled Carbon Nanotubes," Nano Letters, 2002, 2(2), pp. 155-159.
M.F. Islam et al., "Direct Measurement of the Polarized Optical Absorption Cross Section of Single-Wall Carbon Nanotubes," Phys. Rev. Lett. 93(3), 037404 (2004).
N. Akima et al., "Strong Anisotropy in the Far-Infrared Absorption Spectra of Stretch-Aligned Single-Walled Carbon Nanotubes," Advanced Materials, vol. 18, Iss. 9, pp. 1166-1169 (May 2006).
J.H. Lehman et al., Single-Wall Carbon Nanotube Coating on a Pyroelectric Detector, Applied Optics, vol. 44, Iss. 4, pp. 483-488 (2005).

(Continued)

*Primary Examiner* — Christine Sung
(74) *Attorney, Agent, or Firm* — McDermott Will & Emery LLP (57) ABSTRACT

A polarimetric sensor includes a substrate and a plurality of aligned nanotube film patches arranged on the substrate. Each of the plurality of aligned nanotube film patches is oriented on the substrate to sense a different orientational component of electromagnetic radiation. For each of the plurality of aligned nanotube film patches, at least two contacts are arranged in electrical communication with the respective aligned nanotube film patch. The at least two electrodes are configured to conduct to an external circuit an electric signal generated in the respective aligned nanotube film patch when exposed to a respective orientational component of electromagnetic radiation.

21 Claims, 6 Drawing Sheets

OTHER PUBLICATIONS

F.A. Sadjadi et al., "New Experiments in the Use of Infrared Polarization in the Detection of Small Targets," Proc. SPIE, Automatic Target Recognition XI, vol. 4379, pp. 144-155 (2001).

G. Novak "Far-Infrared Polarimetry With SOFIA", SOFIA'S 2020 Vision Scientific and Technological Opportunities Workshop, California Institute of Technology, Pasadena, CA, Dec. 6-8, 2007.

S.L. Chun et al., "Polarimetric Imaging System for Authmatic Target Detection and Recognition", Physics Innovations Inc., Mar. 2000.

Z.M. Li et al., "Polarized Absorption Spectra of Single-Walled 4 A Carbon Nanotubes Aligned in Channels of an $AlPO_4$-5 Single Crystal", Physical Review Letters, The American Physical Society, vol. 87, No. 12, pp. 1274041-1-1274041-4, Sep. 17, 2001.

S. Uryu et al., "Prominent Exciton Absorption of Perpendicularly Polarized Light in Carbon Nanotubes", AIP Conference, vol. 893, pp. 1033-1034, Apr. 10, 2007.

A. Jorio et al., "Resonance Raman Spectra of Carbon Nanotubes by Cross-Polarized Light", Physical Review Letters, the American Physical Society, vol. 90, No. 10, pp. 107403-4-107403-4, Mar. 14, 2003.

E. Cubukcu et al.. "Aligned Carbon Nanotubes As Polarization-Sensitive, Molecular Near-Field Detectors", National Academy of Sciences of the USA, vol. 106, No. 8, pp. 2495-2499, Feb. 24, 2009.

D. Clemens et al., "IMPP: A Far-Infrared Imaging Polarimeter and Photometer for SOFIA", American Astronomical Society, 188th AAS Meeting, #54.12, Bulletin of the American Astronomical Society, vol. 28, p. 906, May 1996.

J. Zallat et al., "Using Polarimetric Imaging for Material Classification", IEEE (2003).

D.C. Hines, et al., "O/IR Polarimetry for the 2010 Decade (CGT): Science at the Edge, Sharp Tools for All", Astro2010: The Astronomy and Astrophysics Decadal Survey, Science White Papers, No. 125, 2009.

K. Ghosh, "Electronic Band Structure of Carbon Nanotubes", Stanford University, pp. 1-17, Nov. 25, 2005.

* cited by examiner

NANOTUBE BASED POLARIMETRIC ELECTROMAGNETIC SENSOR AND FOCAL PLANE ARRAY

STATEMENT REGARDING FEDERALLY SPONSORED RESEARCH OR DEVELOPMENT

Not applicable.

BACKGROUND

The present disclosure concerns the detection of electromagnetic radiation with polarimetric information and, more particularly, polarimetric imaging using a nanotube based imaging sensor or focal plane array.

The detection and imaging of polarization information from electromagnetic radiation has many useful applications. Interest in polarimetric imaging is increasing for applications such as target recognition, target tracking, and astronomy. For example, polarization information can be used to distinguish between man-made objects and natural objects and, in some instances, can help identify specific materials. Polarization information also can be used to gain information on the three-dimensional shape of an object. In astronomy, polarimetry in the far infrared spectrum is used to image magnetic fields surrounding celestial objects.

SUMMARY

The subject technology utilizes nanotubes, such as carbon nanotubes (CNTs), to implement a polarimetric sensor or focal plane array that provides significant advantages over conventional polarimetric imaging systems. Films of aligned nanotubes are used to create polarization dependent sensing elements which vary electrical signals depending on the polarization direction of the electromagnetic radiation incident to the aligned nanotubes. A polarimetric sensor is created by arranging multiple patches of these films in different orientations to sense different orientational components of the electric and magnetic fields in the incident electromagnetic radiation. The electrical signals from the respective aligned nanotube film patches are captured and used to determine the polarization state of the incident electromagnetic radiation.

According to one aspect of the subject technology, a polarimetric sensor includes a substrate and a plurality of aligned nanotube film patches arranged on the substrate. Each of the plurality of aligned nanotube film patches is oriented on the substrate to sense a different orientational component of electromagnetic radiation. For each of the plurality of aligned nanotube film patches, at least two contacts are arranged in electrical communication with the respective aligned nanotube film patch. The at least two electrodes are configured to conduct to an external circuit an electric signal from the respective aligned nanotube film patch when exposed to a respective orientational component of electromagnetic radiation.

According to another aspect of the subject technology, a polarimetric focal plane array includes a substrate and a plurality of polarimetric sensors arranged in a two-dimensional array on the substrate. Each of the plurality of polarimetric sensors includes a plurality of aligned nanotube film patches arranged on the substrate. Each of the plurality of aligned nanotube film patches is oriented on the substrate to sense a different orientational component of electromagnetic radiation. For each of the plurality of aligned nanotube film patches, at least two electrodes are arranged in electrical communication with the respective aligned nanotube film patch. The at least two electrodes are configured to conduct to an external circuit an electric signal from the respective aligned nanotube film patch when exposed to a respective orientational component of electromagnetic radiation.

According to another aspect of the subject technology a method for detecting polarization information from electromagnetic radiation is provided. The method includes the steps of capturing respective electrical signals generated in a plurality of aligned nanotube film patches when exposed to electromagnetic radiation, where the plurality of aligned nanotube film patches are arranged to sense a different orientational component of electromagnetic radiation, and determining polarization information from the electromagnetic radiation based on the captured electrical signals from the plurality of aligned nanotube film patches.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

Most single-walled carbon nanotube (SWCNT) materials synthesized by common methods (e.g. laser ablation, electrical arc, gas-phase catalysis, and chemical vapor deposition) are mixtures of tubes with metallic and semiconducting properties. SWCNTs can be used as produced or suspended in liquids or gels, and cast by spin coating, spray coating, and other methods as thin films. SWCNT materials have optical properties from the ultraviolet region of the electromagnetic spectrum into the terahertz region. Interband transitions (electronic transitions between Van Hove singularities in the one-dimensional density of states) are important in the optical absorption spectra of SWCNTs from the visible to the infrared. These transitions energies (and associated optical absorptions) are dependent upon the structure of the SWCNT and, in particular, the diameter and chirality of the nanotube. Devices made with SWCNT films may generate electrical signals (e.g., photocurrent) when exposed to incident electromagnetic radiation in the range of interband transitions. See M. Engle et al., *ACS Nano*, 2008, 2 (12), 2445-2452. The sensitivity of a CNT photodetector to a particular range of the electromagnetic spectrum may be selected based on the diameter of the CNTs used for its fabrication. At longer wavelengths, other absorption mechanisms are present, including free-carrier absorption. See Itkis et al., *Nano Lett.*, 2002, 2(2), 155-159.

CNTs typically have relatively high aspect ratios of tube length to tube diameter. For example, the tube diameter of a SWCNT produced by the methods mentioned above may range from 0.4 nm to 5 nm, with typical average diameters ranging from 0.8 nm to 3 nm, depending on the method of production. CNT tube length may range from 1 μm to 1 mm or longer, so aspect ratios of 100 to 1000 or greater are possible. When the SWCNT is semiconducting, electron confinement in this high-aspect ratio structure results in quantum mechanical selection rules that favor interband light absorption from photons polarized parallel to the tube axis. See M. F. Islam, D. E. Milkie, C. L. Kane, A. G. Yodh, and J. M. Kikkawa, *Phys. Rev. Lett.*, 93(3), 037404-1 (2004), and references cited therein. Thus, the response of a SWCNT light detecting device depends on the polarization direction of the incoming light relative to SWCNT orientation when interband transitions are the main light absorbing mechanism that leads to electrical signals.

Light detection by CNT devices can also operate from other principles, and these can also be polarization-dependent. For example, polarization dependence in the infrared to far infrared absorption spectra of aligned SWCNT films has been observed. See N. Akima et al., *Adv. Mater.* 2006, 18, 1166-1169. Light absorption in this spectral region has been associated with free-carrier absorption, and the polarization dependence due to the one-dimensional nature of the nanotubes and the density of states. The energy-momentum dispersion relations allow transitions between states within the same band or sub-band, including those that have an energy less than that of the band gap, when the momentum change is also satisfied, and the only direction of motion available in nanotubes is along the nanotube axis, hence the higher absorption when the light is polarized parallel to the nanotubes.

Any detection mechanism capable of responding to a total energy change in the detector material may be used to measure the energy change due to the absorbed light. Two examples of these energy-dependent detection mechansims are bolometric, see M. E. Itkis, et al., *Science*, 2006, 312, 413-416, and pyroelectric, see J. H. Lehman, et al., *App. Optics*, 2005, 44(4), 483-488. Absorption of far-infrared light by films of SWCNTs has been attributed to other mechanisms besides free-carrier excitation. For example, polarization dependent absorption has been attributed to a plasmonic resonance effect in tubes aligned with the light polarization direction. See N. Akima, et al., *Adv. Mater.* 2006, 18, 1166-1169. Regardless of absorption or transduction mechanisms, CNT-based detectors are generally observed to be more sensitive to incident electromagnetic radiation when the polarization direction is aligned with the tube axis of the CNT than when the incident electromagnetic radiation polarization direction is perpendicular to the tube axis of the CNT.

Figure 1:
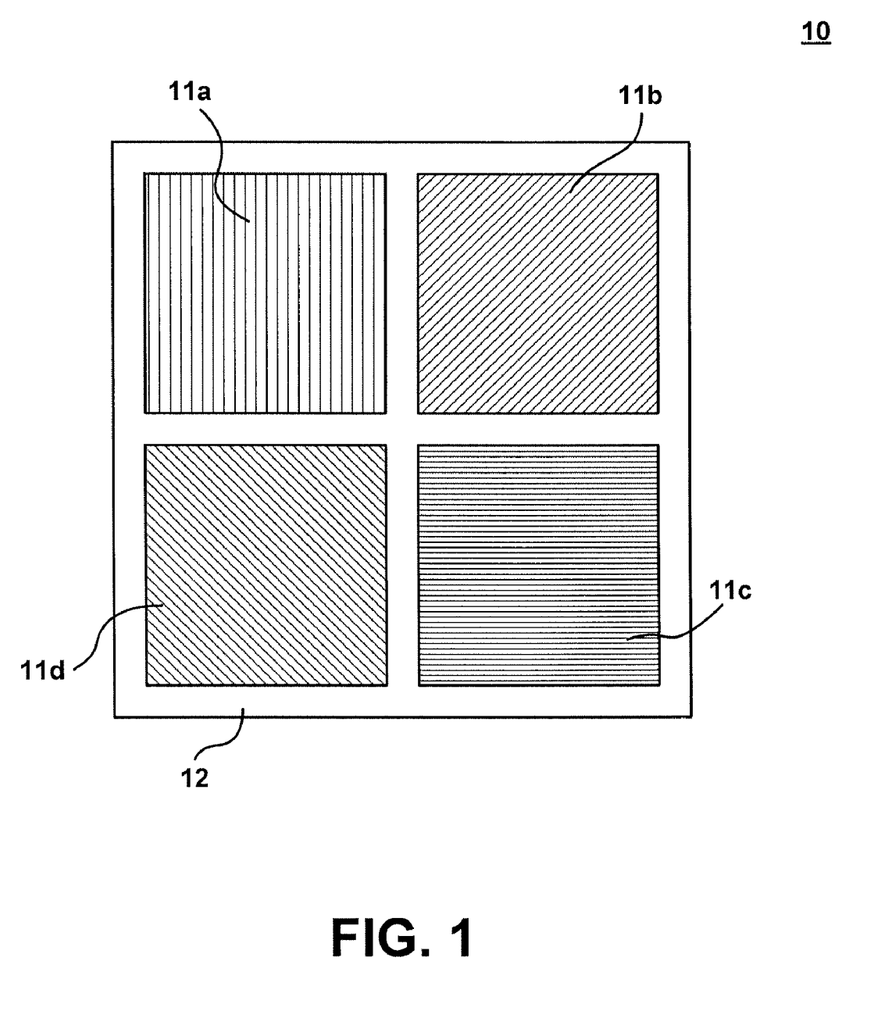
FIG. 1 is a diagram depicting a polarimetric sensor according to one aspect of the subject technology.

The subject technology takes advantage of the foregoing characteristics of CNTs to provide a novel polarimetric sensor. FIG. 1 is a graphical representation of polarimetric sensor 10 according to one aspect of the subject technology. As depicted in FIG. 1, polarimetric sensor 10 includes four aligned CNT film patches 11a, 11b, 11c, and 11d arranged on substrate 12. In brief, patches 11a to 11d are oriented on substrate 12 to sense different orientational components of electric and magnetic fields in electromagnetic radiation incident to sensor 10. Electrical signals from the respective CNT film patches are in turn processed to determine Stokes Vector components that define the polarization state of the incident electromagnetic radiation.

Each of patches 11a to 11d comprises a film of CNTs aligned in parallel with one another. The CNTs used in the film(s) for patches 11a to 11d may be selected to have diameters (bandgaps) corresponding to a desired range of the electromagnetic spectrum (e.g., infrared). As noted above, a number of techniques exist for manufacturing aligned CNT films. For example, vertically aligned CNT films may be grown from a catalyst patterned on a substrate. These vertically aligned CNT films may be transferred to a second substrate and arranged to lie parallel to the surface of the second substrate. Alternative techniques include aligning CNTs in a fluid meniscus or in microfluidic channels, growing aligned CNT arrays on materials such as sapphire, and growing CNTs in aligned pores of other nanostructured materials. The foregoing techniques, as well as others, are known to those skilled in the art and will not be described in detail herein. Those skilled in the art will recognize that the subject technology is not limited to any particular technique for producing aligned CNT films and may be practiced using aligned CNT films made using any known manufacturing technique.

The aligned CNT film is subsequently transferred and arranged on a substrate, such as substrate 12 depicted in FIG. 1. Substrate 12 may be made of any of a number of different materials so long as the material is capable of supporting patches 11a to 11d as well as one or more layers of metallization for conducting the electrical signals from the CNTs of patches 11a to 11d to an external circuit. For example, substrate 12 may be a relatively rigid material such as a silicon substrate or a relatively flexible structure such as a polyimide film. Once arranged on substrate 12, the aligned CNT film may be patterned using lithography and etching techniques to form one of patches 11a to 11d.

As depicted in FIG. 1, polarimetric sensor 10 includes four patches of aligned CNT films oriented on substrate 12 to sense different respective orientational components of the electric and magnetic fields in electromagnetic radiation incident to sensor 10. According to one aspect of the subject technology, each patch is arranged on substrate 12 by transferring an aligned CNT film to substrate 12 and orienting the aligned CNT film, and correspondingly the CNTs within the film, with an alignment angle. Once the aligned CNT film is arranged and oriented on substrate 12, lithography and etching methods may be employed to pattern the aligned CNT film to produce a patch on substrate 12. These steps are repeated for each of patches 11a to 11d using respective alignment angles for each patch. In the example depicted in FIG. 1, alignment angles of 0°, 45°, 90° and 135° are used for patches 11a to 11d, respectively.

Patches 11a to 11d are depicted in FIG. 1 as being square-shaped and arranged adjacent to one another in a square pattern. According to one aspect of the subject technology, each of patches 11a to 11d is approximately 10 μm on each side. Those skilled in the art will recognize that the subject technology is not limited to this arrangement of patches 11a to 11*d*. For example, the dimensions of patches 11*a* to 11*d* may range between 5 µm and 40 µm on each side. Additionally, the shape of patches 11*a* to 11*d* is not limited to square shapes and may be other geometric shapes arranged in patterns different from that depicted in FIG. 1 without departing from the scope of the subject technology.

Polarimetric sensor 10 further includes one or more layers of metallization (not shown) arranged to conduct electrical signals from the CNTs of patches 11*a* to 11*d* to an external circuit for capture and processing. According to one aspect of the subject technology, the one or more layers of metallization include at least two contacts arranged in electrical communication with each of patches 11*a* to 11*d*. The two contacts are arranged so that the CNTs within the patch are in electrical communication with the contacts.

Figure 2A:
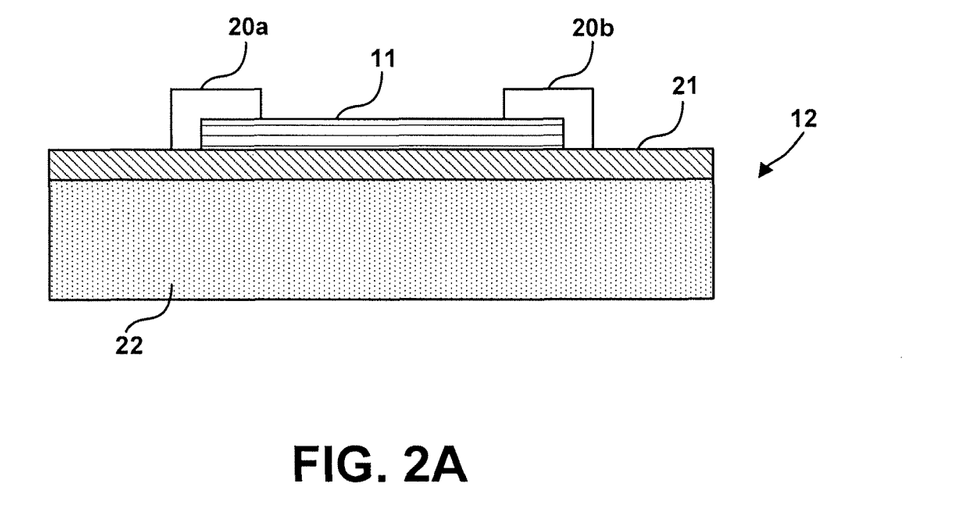
FIGS. 2A, 2B, and 2C are diagrams depicting a partial profile view of a polarimetric sensor according to aspects of the subject technology.

FIG. 2A is a graphical representation of a profile view of one of the aligned CNT film patches 11 arranged on substrate 12 according to one aspect of the subject technology. As depicted in FIG. 2A, contacts 20*a* and 20*b* are formed over opposing ends of patch 11, such that the CNTs within patch 11 are in electrical communication with contacts 20*a* and 20*b*. An insulating layer 21 formed over base substrate 22, together comprising substrate 12, electrically insulates contact 20*a* from contact 20*b* and further insulates patch 11 and contacts 20*a* and 20*b* from other patches and contacts (not shown) arranged on substrate 12. The one or more layers of metallization may further include conductive traces (not shown) on and/or in substrate 12 to electrically couple contacts 20*a* and 20*b* with respective contact pads (not shown) on substrate 12 for communicating the electrical signals from patch 11 to an external circuit for capture and processing. The contacts and conductive traces may be made of any of a number of metals and/or metal alloys known to those skilled in the art. For example, the contacts may be made of palladium and the traces made of gold.

Using the arrangement of one or more metallization layers discussed above with respect to FIG. 2A, each of patches 11*a* to 11*d* may be placed in electrical communication with respective contact pads on substrate 12. The formation of the one or more layers of metallization may be done using deposition, lithography, and patterning techniques known to those skilled in the art. In alternative arrangements, traces and contacts may be formed on substrate 12 prior to the transfer and patterning of patches 11*a* to 11*d* on substrate 12. In these alternative arrangements, the patches are arranged and patterned to align with respective pairs of contacts previously formed on substrate 12 and annealing may be used to make the electrical contact between the CNTs and the respective contacts on substrate 12.

Figure 2B:
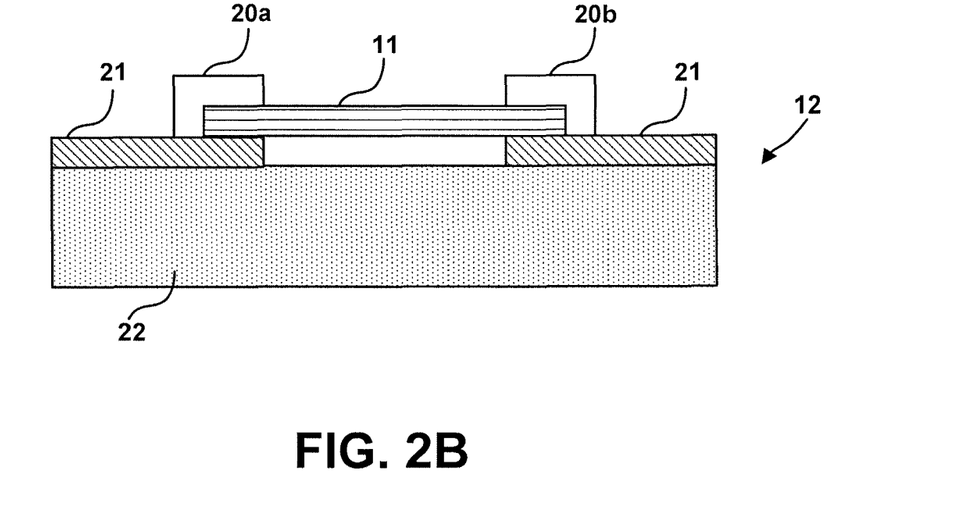

FIG. 2A discussed above illustrates an arrangement of one of the aligned CNT film patches 11 in which patch 11 is in contact with insulating layer 21 formed over base substrate 22. FIG. 2B illustrates an arrangement of one of the aligned CNT film patches 11 in which a trench is formed beneath patch 11 in order to reduce thermal contact between the CNT film patch and the insulating layer 21 and base substrate 22. Heat transfer from insulating layer 21 and base substrate 22 to film patch 11 may alter the properties of the CNTs within the film patch causing electric signals from the film patch to vary for reasons other than incident electromagnetic radiation. Suspending at least a portion of film patch 11 above insulating layer 21 and base substrate 22 may reduce heat transfer. In the case of bolometric detecting mechanisms, reducing thermal conductivity of the film patch to the substrate may improve the bolometric sensitivity.

The trench beneath film patch 11 in FIG. 2B may be formed using any of a number of techniques familiar to those skilled in the art. For example, insulating layer 21 may be patterned using photolithography and etching processes to form the trench prior to film patch 11 being arranged thereon. Base substrate 22 also may be patterned in a similar manner to form a trench. A temporary layer (not shown), such as a polymer, may be used to fill the trench during the process steps used to position and pattern film patch 11. The temporary layer may be removed after film patch 11 has been positioned and patterned. Alternatively, insulating layer 21 may be formed using a photosensitive material that is patterned using photolithography to define the trench and etched after film patch 11 positioned thereon to remove the material in the trench. Contacts 20*a* and 20*b* may act as clamps on the edges of film patch 11 to maintain the suspension of film patch 11 over the trench.

Figure 2C:
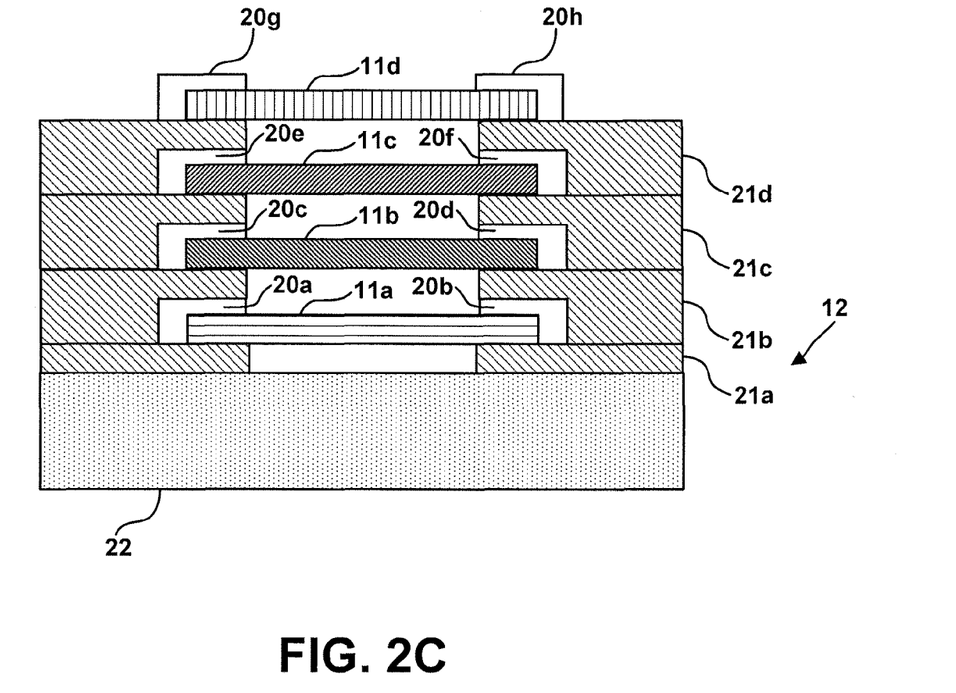

As represented in FIG. 1, film patches 11*a*-11*d* are coplanarly arranged adjacent one another on substrate 12. In an alternative arrangement, film patches 11*a*-11*d* may be stacked one upon another to reduce the footprint of the polarimetric sensor. FIG. 2C is a graphical representation of an arrangement with four film patches stacked on substrate 12 according to one aspect of the subject technology.

As depicted in FIG. 2C, film patch 11*a* is arranged on insulating layer 21*a* with contacts 20*a* and 20*b* formed on respective edges of film patch 11*a* to claim film patch 11*a* over the trench formed in insulating layer 21*a*. The processes used to form and arrange insulating layer 21*a*, film patch 11*a*, and contacts 20*a* and 20*b* are repeated for subsequent layers. As depicted in FIG. 2C, insulating layer 21*b*, film patch 11*b*, and contacts 20*c* and 20*d* are arranged on top of the first layer. Insulating layer 21*c*, film patch 11*c*, and contacts 20*e* and 20*f* are arranged on top of the second layer. Insulating layer 21*d*, film patch 11*d*, and contacts 20*g* and 20*h* are arranged on top of the third layer. The respective trenches formed in insulating layers 21*b*, 21*c*, and 21*d* are aligned to allow incident electromagnetic radiation that is not absorbed in an upper layer to reach the film patch in each respective layer. The different alignments of the nanotubes within each film patch allow portions of the electromagnetic radiation not aligned with the nanotubes of the film patch in an upper layer to reach the film patch in a lower layer. While four layers are depicted in FIG. 2C, a stacked arrangement with only two or three layers also may be used without departing from the scope of the invention.

Figure 3:
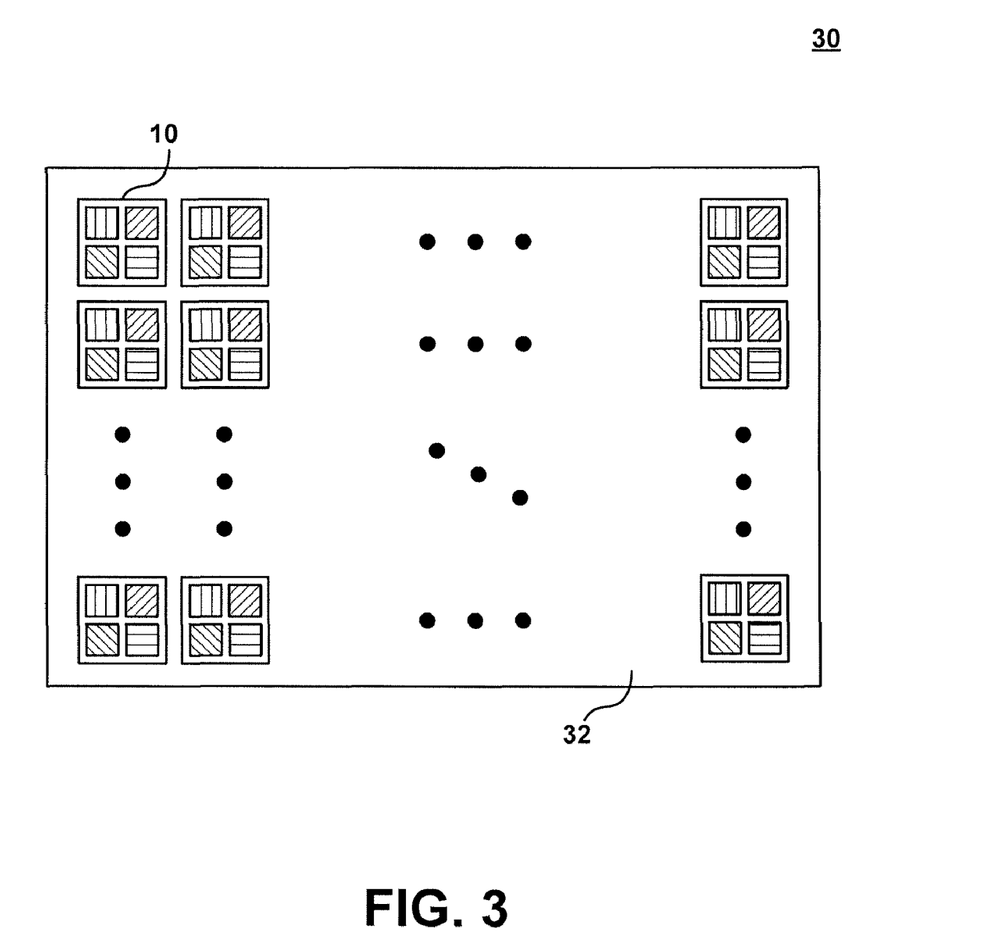
FIG. 3 is a diagram depicting a polarimetric focal plane array according to one aspect of the subject technology.

Multiple instances of polarimetric sensor 10 described above may be used as individual pixels in a polarimetric imaging focal plane array. FIG. 3 is a graphical depiction of polarimetric focal plane array 30 according to one aspect of the subject technology. As depicted in FIG. 3, a plurality of polarimetric sensors 10 are arranged in a grid-like pattern on substrate 32. The number of polarimetric sensors 10 in each column and row on substrate 32 is not limited by the subject technology and may vary depending on the intended application, project specifications, project budgets, etc. For example, focal plane array 30 may include an array of 320 by 240 polarimetric sensors 10, 512 by 512 polarimetric sensors 10, or 1024 by 1024 polarimetric sensors 10. Those skilled in the art will recognize that the subject technology is not limited to the grid-like pattern of sensors depicted in FIG. 3 and may be practiced using other types of formations to arrange the sensors on substrate 32.

Substrate 32 may be the same substrate as substrate 12 described above with respect to FIG. 1, only enlarged to accommodate multiple groups of patches 11*a* to 11*d*. Alternatively, each polarimetric sensor 10 may include an individual substrate 12 that is mounted on substrate 32. Similar to the substrate described above with respect to FIGS. 1 and 2, substrate 32 may have one or more layers of metallization (not shown) that include contact pads and conductive traces for electrically communicating electrical signals from the patches to an external circuit for capture and processing.

Figure 4:
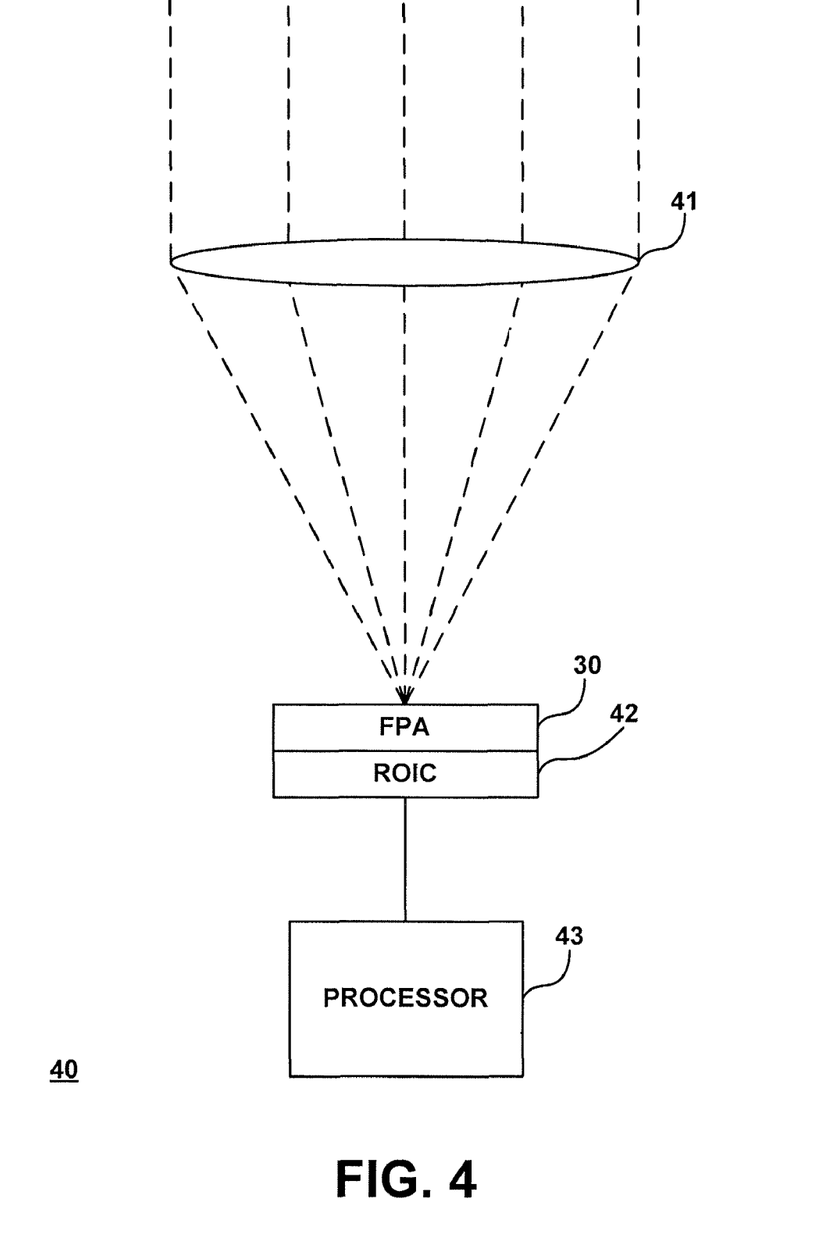
FIG. 4 is a diagram depicting a polarimetric imaging system according to one aspect of the subject technology.

Polarimetric focal plane array 30 may be used in a polarimetric imaging system. FIG. 4 is a block diagram depicting components of polarimetric imaging system 40 according to one aspect of the subject technology. As depicted in FIG. 4, polarimetric imaging system 40 includes optics 41, polarimetric focal plane array 30, readout integrated circuit 42 and processor 43. In brief, polarimetric focal plane array 30 is positioned along the focal plane of optics 41 and generates electrical signals in accordance with the polarization direction of electromagnetic radiation incident to optics 41. The generated electrical signals are subsequently captured by readout integrated circuit 42 and communicated to processor 43 for processing.

Optics 41 represents one or more optical components (e.g., lens, reflector, etc.) configured to capture and focus electromagnetic radiation received from a field of view on focal plane array 30. The actual optical components that make up optics 41 depend on the intended application of imaging system 40. As mentioned above, polarimetric imaging is employed in areas such as target recognition and tracking as well as astronomy, each of which may have unique optical requirements. It is noted that the subject technology is not limited to any particular polarimetric application and corresponding optical components. However, those skilled in the art will recognize the advantages the subject technology provides in reducing the complexity often involved in conventional polarimetric imaging systems.

In FIG. 4, readout integrated circuit (ROIC) 42 is an external circuit electrically coupled to focal plane array 30 and is configured to capture the electrical signals generated in each of the patches of the polarimetric sensors arranged in focal plane array 30. The captured electrical signals may be digitized and provided to processor 43 for further processing. The digitization may occur within ROIC 42 or within processor 43. The rate at which the generated electrical signals are captured by ROIC 42 may vary depending on the application in which system 40 is being employed. For example, a sample may be captured and communicated to processor 43 every 10 seconds, 5 seconds, 1 second, fraction of a second, etc. The structure and operation of ROICs are well known to those skilled in the art and will not be described in detail herein.

Processor 43 is coupled to ROIC 42 and is configured to receive the electrical signals captured by ROIC 42 from each of the polarimetric sensors in focal plane array 30. Processor 43 is further configured to process these electrical signals to determine polarization information of the incident electromagnetic radiation. As discussed above with respect to FIG. 1, patches 11a to 11d in each of polarimetric sensors 10 are aligned with a respective alignment angle. In the example described above, the alignment angles of the four patches are 0°, 45°, 90° and 135°, respectively. Using the captured electrical signals from each patch and the formulas set forth below, information on the polarization state of the electromagnetic radiation incident to the imaging sensor may be determined by processor 43.

Those skilled in the art are familiar with algorithms for converting polarimetric sensor data to useful polarization information. For example, the method outlined in *Automatic Target Recognition XI*, Firooz A. Sadjadi, Editor, Proceedings of SPIE Vol. 4379 (2001), pages 144-255 is summarized below. The polarization state of light can be characterized by four Stokes parameters (I, Q, U, V), defined as components of the Poincaré sphere. The Stokes parameters can be transformed into percent of polarization P and angle of polarization phi using the relations:

$$P=100*SQRT(Q^2+U^2)/I \qquad (1)$$

$$phi=(\tfrac{1}{2})*arctan(U/Q) \qquad (2)$$

The Stokes parameters I, Q, and U can be determined from the sensor patches by the equations:

$$I=(\tfrac{1}{2})*(i_0+i_{45}+i_{90}+i_{135}) \qquad (3)$$

$$Q=(i_0-i_{90}) \qquad (4)$$

$$U=(i_{45}-i_{135}) \qquad (5)$$

where the terms $i_x$ are the light intensities determined from each patch with orientation x. It is assumed that the intensities $i_x$ are calculated by converting electrical signals from the patches by calibration to known light levels. The determined parameters I, P, and phi are adequate for many polarimetric applications.

Additional information about circular polarization of the incident electromagnetic radiation can be obtained if optical elements such as retarder plates are added to some patches, as in the method described in C. S. L. Chun and F. A. Sadjadi, "Polarimetric imaging *system for automatic target detection and recognition*," Proceedings of the Military Sensing Symposia Specialty Group on Passive Sensors, Charleston, S.C., Mar. 22, 2000. Processor 43 may generate additional information based on the determined polarization of the incident electromagnetic radiation depending on the polarimetric application the system is being employed to perform.

Processor 43 represents a processing system configured to process the electrical signals received from ROIC 42. Processor 43 may be a general purpose computer programmed to process the electrical signals or a special-purpose system specifically designed for a particular polarimetric application. Generally speaking, processor 43 includes a computer/machine-readable medium and a processing unit configured to execute one or more sequences of instructions stored on the computer/machine-readable medium. The processor may be a general purpose microprocessor, a field programmable gate array, an application-specific integrated circuit, etc. The computer/machine-readable medium may include magnetic media (e.g., hard drive, floppy disk, tape, etc.), optical media (e.g., CDROM, DVD, etc.) or electrical media (e.g., flash memory, random access memory, etc.), or any combination of these media. The instructions may be encoded on the medium in any of a number of different programming languages known to those skilled in the art. The information/data generated by processor 43 may be stored on the computer/machine-readable medium for future reference or processing. Additionally, processor 43 may be in communication with a display device such as a monitor to display the information/data to a system operator.

Figure 5:
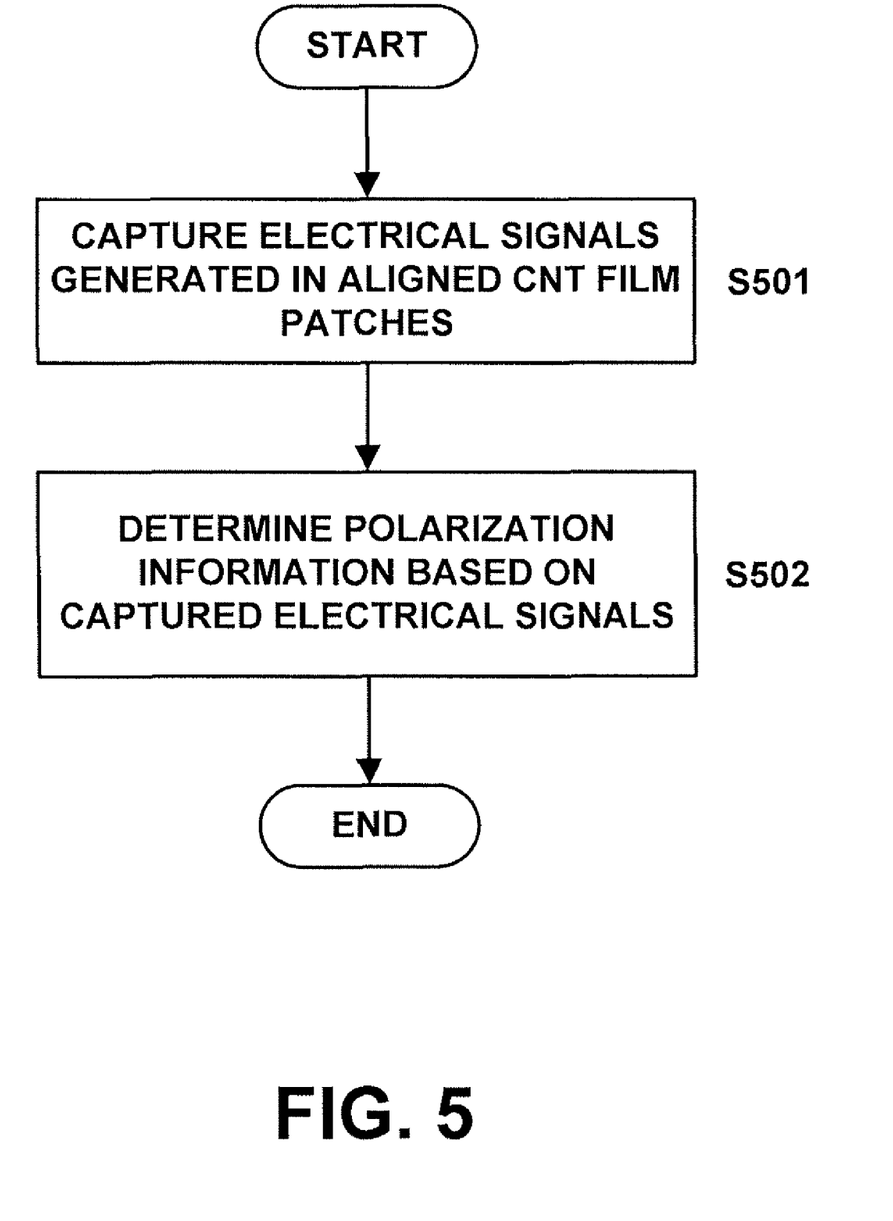
FIG. 5 is a flowchart depicting a process for detecting polarization information from electromagnetic radiation according to one aspect of the subject technology.

Using the subject technology described above, a method for detecting polarization information from incident electromagnetic radiation may be performed. FIG. 5 is a flowchart summarizing steps of such a method. A plurality of aligned carbon nanotube film patches are arranged on or suspended over a substrate in the manner described above. Each of the aligned carbon nanotube patches is oriented on or suspended over the substrate to sense a different orientational component of the electric and magnetic fields in the electromagnetic radiation. In step S501, electrical signals from the plurality of aligned carbon nanotube patches when exposed to electromagnetic radiation are captured. In step S502, polarization information from the electromagnetic radiation is determined based on the captured electrical signals generated in the plurality of aligned carbon nanotube patches.

The foregoing examples described four aligned CNT patches arranged in each polarimetric sensor using alignment angles of 0°, 45°, 90° and 135°, respectively. The subject technology is not limited to this number of patches and specific alignment angles. For example, more or less than four patches may be arranged in each imaging sensor and the alignment angles may differ from those described above.

The polarimetric focal plane array and component imaging sensors described above comprised of aligned CNT patches made from CNTs have common parameters such as bandgap and nanotube diameter corresponding to a desired range of the electromagnetic spectrum. The subject technology is not limited to this configuration. In alternative configurations, the polarimetric sensors may be comprised of respective sets of patches where each set is made from CNTs having a bandgap (diameter) different from the other sets within the imaging sensor. A respective ROIC is electrically coupled to each set of patches within the imaging sensor as well as to corresponding sets of patches in other imaging sensors within a focal plane array comprised of multiple instances of the imaging sensor. In this manner, a polarimetric imaging system may be implemented that is capable of sensing polarization information for multiple portions of the electromagnetic spectrum simultaneously.

Conventional polarimetric imaging systems typically rely on polarization filters or other devices to separate and transmit components of polarized electromagnetic radiation to one or more sensing elements. For example, wire grids and/or crystals are often used to filter polarized electromagnetic radiation prior to the electromagnetic radiation reaching a polarization insensitive sensing element. Other conventional solutions rely on mechanical systems to scan polarized electromagnetic radiation to sensing elements or additional optics to focus the components of polarized electromagnetic radiation on the sensing elements. These conventional solutions increase the complexity of building and configuring a polarimetric imaging system and possibly limit the field and resolution available to the application.

The subject technology overcomes the complexity issues faced by conventional polarimetric imaging systems by employing a polarization sensitive (polarimetric) sensor that does not rely on filters or other devices to separate electromagnetic radiation of different polarization directions. Rather, the polarimetric sensor of the subject technology utilizes the properties of CNTs arranged in multiple patches within the sensor to sense different respective polarization components of incident electromagnetic radiation, as described above. This in turn expands the possible field and resolution available to the subject technology compared to that available with conventional solutions.

The foregoing examples describe the use of CNTs to form polarimetric sensors. Those skilled in the art will recognize that other types of nanotubes and nanowires may be used in place of CNTs for different applications and to detect different portions of the electromagnetic spectrum. For example, boron nitride based nanotubes and silicon based nanowires have properties and dimensions similar to those of CNTs mentioned above that also make them sensitive to the polarization of incident electromagnetic radiation. Those skilled in the art will recognize that the arrangement and operation of the CNTs discussed above may be used with these other nano materials to form polarimetric sensors and sensor arrays.

The foregoing examples refer to electric signals from the film patches used to form the polarimetric sensors to sense the polarization components of incident electromagnetic radiation. Electric signals may include photovoltage or photocurrent generated within the nanotube as a result of absorbing a portion of the incident electromagnetic radiation. This photovoltage or photocurrent may be read out with the ROIC mentioned above. The subject technology is not limited to detection mechanisms that rely on an electric signal to be generated by the film patches. Other detection mechanisms may be used to provide electric signals from the film patches based on the polarization of incident electromagnetic radiation. For example, changes in a material property of the CNTs or other nano materials due to incident electromagnetic radiation may be probed and measured to detect the polarization components. For example, the ROTC may apply a voltage or current to the respective film patches and measure a property such as resistance of the film for a bolometric detection mechanism.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A polarimetric sensor, comprising:
   a substrate;
   a plurality of aligned nanotube film patches arranged on the substrate, wherein each of the plurality of aligned nanotube film patches is oriented on the substrate to sense a different orientational component of electromagnetic radiation, and wherein the plurality of aligned nanotube film patches are arranged to at least partially overlap one another on the substrate; and
   for each of the plurality of aligned nanotube film patches, at least two electrodes arranged in electrical communication with the respective aligned nanotube film patch,
   wherein the at least two electrodes are configured to conduct to an external circuit an electric signal from the respective aligned nanotube film patch when exposed to a respective orientational component of electromagnetic radiation.

2. The polarimetric sensor according to claim 1, wherein four aligned nanotube film patches are arranged on the substrate.

3. The polarimetric sensor according to claim 2, wherein the four aligned nanotube film patches are arranged at alignment angles of 0°, 45°, 90° and 135°, respectively, relative to an edge of the polarimetric sensor.

4. The polarimetric sensor according to claim 1, wherein the plurality of aligned nanotube film patches generate electric signals when exposed to infrared electromagnetic radiation.

5. The polarimetric sensor according to claim 1, wherein the plurality of aligned nanotube film patches are arranged adjacent to one another on the substrate.

6. The polarimetric sensor according to claim 1, wherein the orientations of the plurality of aligned nanotube film patches correspond to orientational components of electromagnetic radiation used to determine Stokes vector components.

7. The polarimetric sensor according to claim 1, wherein the nanotube film patches comprise single-walled carbon nanotubes.

8. A polarimetric focal plane array, comprising:
   a substrate; and
   a plurality of polarimetric sensors arranged in a two-dimensional array on the substrate, wherein each of the plurality of polarimetric sensors comprises:
      a plurality of aligned nanotube film patches arranged on the substrate, wherein each of the plurality of aligned nanotube film patches is oriented on the substrate to sense a different orientational component of electromagnetic radiation, and wherein the plurality of aligned nanotube film patches of each of the plurality of polarimetric sensors are arranged to at least partially overlap one another on the substrate; and
      for each of the plurality of aligned nanotube film patches, at least two electrodes arranged in electrical communication with the respective aligned nanotube film patch,
      wherein the at least two electrodes are configured to conduct to an external circuit an electric signal from the respective aligned nanotube film patch when exposed to a respective orientational component of electromagnetic radiation.

9. The polarimetric focal plane array according to claim 8, wherein each of the plurality of polarimetric sensors comprises four aligned nanotube film patches arranged on the substrate.

10. The polarimetric focal plane array according to claim 9, wherein the four aligned nanotube film patches in each of the plurality of polarimetric sensors are arranged at alignment angles of 0°, 45°, 90° and 135°, respectively, relative to an edge of the respective polarimetric sensor.

11. The polarimetric focal plane array according to claim 8, wherein the plurality of aligned nanotube film patches generate electric signals when exposed to infrared electromagnetic radiation.

12. The polarimetric focal plane array according to claim 8, wherein the plurality of aligned nanotube film patches of each of the plurality of polarimetric sensors are arranged adjacent to one another on the substrate.

13. The polarimetric focal plane array according to claim 8, wherein the orientations of the plurality of aligned nanotube film patches of each of the plurality of polarimetric sensors correspond to orientational components of electromagnetic radiation used to determine Stokes vector components.

14. The polarimetric focal plane array according to claim 8, wherein the external circuit comprises a read-out circuit electrically coupled to the contacts, wherein the read-out circuit is configured to buffer the electrical signals from the plurality of aligned nanotube film patches and communicate the buffered electrical signals to a signal processor.

15. The polarimetric focal plane array according to claim 8, wherein the nanotube film patches comprise single-walled carbon nanotubes.

16. A method for detecting polarization information from electromagnetic radiation, the method comprising the steps of:
   capturing respective electrical signals from a plurality of aligned nanotube film patches when exposed to electromagnetic radiation, wherein the plurality of aligned nanotube film patches are arranged on a substrate to sense a different orientational component of the electromagnetic radiation, and wherein the plurality of aligned nanotube film patches are arranged to at least partially overlap one another on the substrate; and
   determining polarization information from the electromagnetic radiation based on the captured electrical signals from the plurality of aligned nanotube film patches.

17. The method according to claim 16, wherein the arranging step comprises arranging four aligned nanotube film patches on the substrate.

18. The method according to claim 17, wherein the four aligned nanotube film patches are arranged at alignment angles of 0°, 45°, 90° and 135°, respectively.

19. The method according to claim 16, wherein the electromagnetic radiation is infrared electromagnetic radiation.

20. The method according to claim 16, wherein the determining step comprises determining Stokes vector components based on the captured electrical signals.

21. The method according to claim 16, wherein the nanotube film patches comprise single-walled carbon nanotubes.

* * * * *